Nov. 14, 1967 R. P. HALVERSON 3,353,169

MULTI-APERTURE MATED THIN FILM MEMORY ELEMENT

Filed Oct. 23, 1965 3 Sheets-Sheet 1

INVENTOR
RICHARD P. HALVERSON
BY Thomas J. Nikolai
ATTORNEY

Nov. 14, 1967 R. P. HALVERSON 3,353,169

MULTI-APERTURE MATED THIN FILM MEMORY ELEMENT

Filed Oct. 23, 1965 3 Sheets-Sheet 2

INVENTOR
RICHARD P. HALVERSON
BY Thomas J. Nikolai
ATTORNEY

MULTI-APERTURE MATED THIN FILM MEMORY ELEMENT

Filed Oct. 23, 1965 3 Sheets-Sheet 3

INVENTOR
RICHARD P. HALVERSON
BY Thomas J. Nikolai
ATTORNEY

United States Patent Office 3,353,169

Patented Nov. 14, 1967

3,353,169

MULTI-APERTURE MATED THIN FILM MEMORY ELEMENT

Richard P. Halverson, Minneapolis, Minn., assignor to Sperry Rand Corporation, New York, N.Y., a corporation of Delaware Filed Oct. 23, 1965, Ser. No. 503,364
4 Claims. (Cl. 340—174)

ABSTRACT OF THE DISCLOSURE

A magnetizable memory element that includes a plurality of thin-ferromagnetic-film layers that are formed in a stacked, superposed relationship and that has a first portion that envelops a suitable drive line, and which first portion has overlapping sides that form closely-coupled portions on both sides of said drive line creating a substantially-closed first flux path about the enveloped drive line and that has a second portion that provides a second closed flux path to fields in the planes of said layers and orthogonal to the first flux path.

Figure 1:
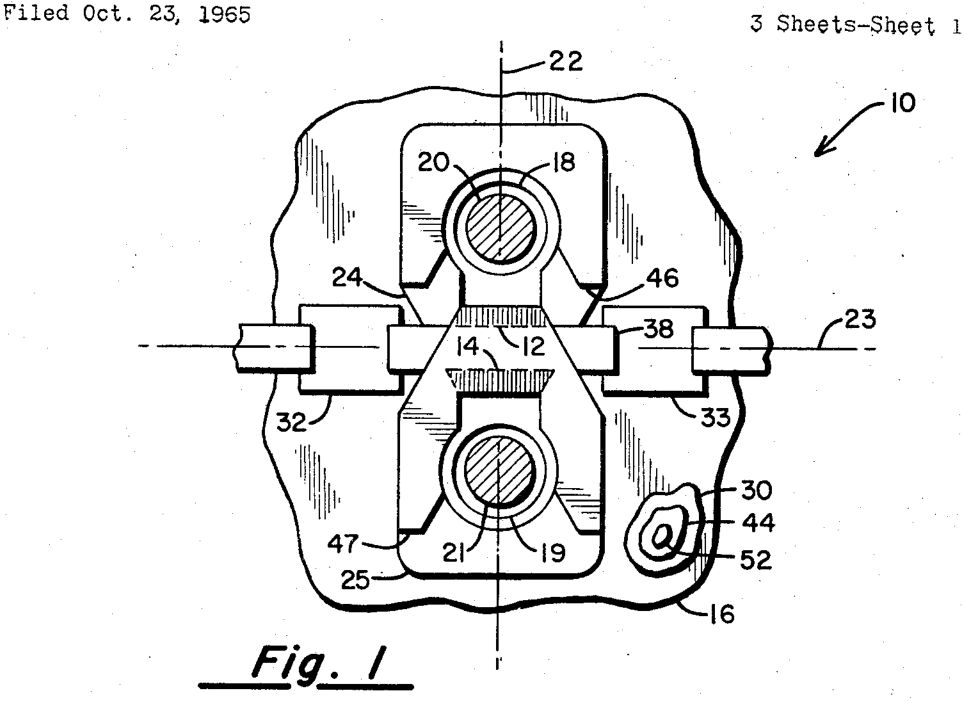

The present invention is an improvement in the Mated-Film memory element disclosed in the copending patent applications of K. H. Mulholland, Ser. No. 498,743, filed Oct. 20, 1965, and R. J. Bergman et al., Ser. No. 504,543, filed Oct. 24, 1965. The copending Mulholland application discloses a Mated-Film element that includes two thin-ferromagnetic film layers that are formed in a stacked, superposed relationship about a suitable drive line and whose overlapping sides form closely-coupled Mated-Film portions creating a substantially-closed flux path about the enveloped drive line. The enveloped drive line is typically a common bit and sense line used to sense the element's output during the read operation and to carry bit current during the write operation. The axis of anisotropy, or easy axis, is in the circumferential direction about the enveloped drive line, i.e., orthogonal to the longitudinal axis of the enveloped drive line, whereby the enveloped drive line provides a longitudinal drive field $H_l$ in a circumferential direction about the enveloped drive line in the area of the Mated-Film element causing the flux in the two layers of the Mated-Film element to become aligned in an antiparallel relationship. A second drive line, preferably a printed circuit member, running over and returning under the Mated-Film element is oriented with its longitudinal axis parallel to the easy axis of the Mated-Film element whereby the enveloping drive line when coupled by an appropriate current signal produces a transverse drive field $H_t$ in the area of the Mated-Film element. The resulting product constitutes a memory cell that possesses all the desirable characteristics of a planar, thin ferromagnetic film memory element while being substantially unaffected by the creep phenomenon.

The copending patent application of R. J. Bergman et al. discloses an improvement of the copending patent application of Mulholland wherein the enveloping word line of the Mulholland application is replaced by a word line that envelops the Mated-Film element but is oriented in the area of the Mated-Film element with its longitudinal axis orthogonal to the plane of and to the easy axis of the Mated-Film element whereby the enveloping word line, when coupled by appropriate current signals produces a transverse drive field $H_t$ in the area of the Mated-Film element. Additionally, there is provided a planar layer of high permeability material that is stacked above and is parallel to the plane of the Mated-Film element for providing a low reluctance, substantially-closed flux path for the transverse drive field $H_t$ provided by the energized word line. The high permeability layer has an aperture between the enveloping word lines in the area of the Mated-Film element whereby the flux provided by the energized word line passes through the high permeability layer but due to the aperture in the high permeability layer in the area of the Mated-Film element such flux is caused to pass through the layers of the Mated-Film element in a direction transverse to the easy axis thereof. This packaging technique provides a highly efficient and compact three-dimensional matrix array.

The present invention is a further improvement of such copending applications in that there is provided herein a Mated-Film memory element wherein the thin-ferromagnetic-film layers that form the Mated-Film element also provide the closed flux path for energized word line drive fields thus eliminating the high permeability layer of the Bergman et al. application. The elimination of this additional high permeability layer provides thereby a Mated-Film element that may be formed wholly by a continuous vapor deposition process.

The thin-ferromagnetic-film layers of the preferred embodiment have single domain properties although such is not required by the present invention. The term "single domain property" may be considered the magnetic characteristic of a three-dimensional element of magnetizable material having a thin dimension that is substantially less than the width and length thereof wherein no magnetic domain walls can exist parallel to the large surface of the element. The term "magnetizable" material shall designate a substance having a remanent magnetic flux density that is substantially high, i.e., approaches the flux density at magnetic saturation.

Accordingly, it is a primary object of this invention to provide a novel memory element and method of packaging thereof by a continuous deposition process.

It is a further object of this invention to provide a magnetizable memory element that includes a plurality of thin-ferromagnetic-film layers that are formed in a stacked, superposed relationship and that have a first portion that envelops a suitable drive line and which first portion has overlapping sides that form closely-coupled portions on both sides of the enveloped drive line creating a substantially-closed first flux path about the enveloped drive line and that has a second portion that provides a second closed flux path to fields in the plane of said films and orthogonal to the first flux path.

These and other more detailed specific objectives will be disclosed in the following specification, reference being had to the accompanying drawings.

With particular reference to FIGURE 1 there is presented an illustration of a plan view of the Mated-Film element of the present invention. As discussed hereinabove, and more in detail in the above discussed copending patent application of K. H. Mulholland, the Mated-Film element achieves its unique operating characteristic, as compared to coupled-film elements, due to the sandwiched arrangement of the thin-ferromagnetic-film layers and the enveloped bit line. The two thin-ferromagnetic-film layers are formed in a stacked, superposed relationship about the bit line with such film layers having sides overlapping the enveloped bit drive line whereby there is formed at the overlapping sides closely-coupled mated-film portions of such film layers that create a substantially-closed flux path about the enveloped drive line.

With particular reference to FIGURE 1 there is presented an illustration of a plan view of the Mated-Film element 10 of the present invention. As discussed hereinbefore, and as discussed in more detail in the above discussed copending patent application of K. H. Mulholland, the Mated-Film element achieves its unique operating characteristic, as compared to coupled-film elements, due to the sandwiched arrangement of the thin-ferromagnetic-film layers and the enveloped bit line. The shaded areas defining these closely coupled Mated-Film areas of memory element 10 of FIGURE 1 are identified by the reference numbers 12 and 14.

Element 10 is composed of a plurality of stacked, superposed layers some having a contour or shape that is specifically designed to permit the fabrication thereof in a continuous series of discrete deposition steps wherein there are utilized a plurality of shape defining "masks," one for each layer, for the definition of the outline or planar contour of the different layers. Element 10 is formed in the following steps:

(A) The base element of element 10 is planar glass substrate 16 of 0.006 inch thickness that has a pair of spaced-apart apertures 18, 19 therethrough; apertures 18, 19 provide the openings through which the herein below to-be-discussed word lines 20, 21 pass perpendicularly through the plane of substrate 16. Axes 22, 23 are here utilized only to define the major and minor axes, respectively, of element 10 for purposes of orienting the elements and magnetic axes thereof.

Figure 2:
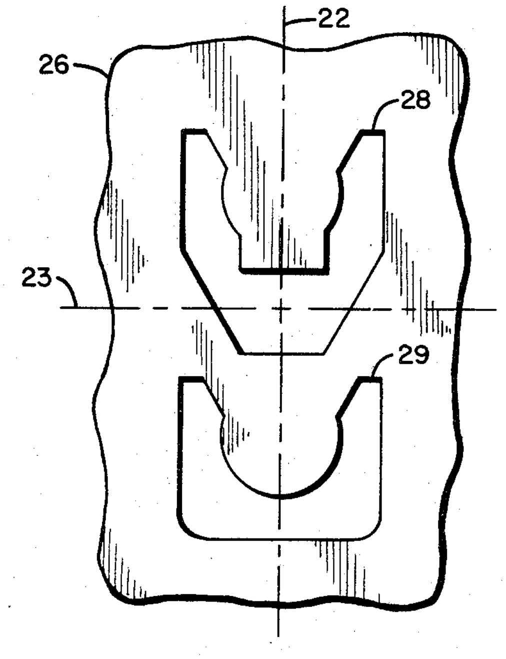

(B) Upon substrate 16 and about apertures 18, 19 are vapor deposited two C-shaped thin-ferromagnetic-film layers 24, 25 each of 4,000 Angstroms (A.) in thickness and approximately 80% Ni-20% Fe and having an anisotropic axis aligned with axis 22 providing an easy axis thereby. With particular reference to FIGURE 2 there is illustrated a portion of mask 26 having apertures 28, 29 therethrough, each defining the contour of layers 24, 25, respectively, when utilized in a continuous deposition process such as disclosed in the S. M. Rubens et al. Patent No. 3,155,561.

(C) Next, a silicon monoxide (SiO) layer 30 of 5,000 A. in thickness is vapor deposited on layers 24, 25 and substrate 16.

Figure 3:
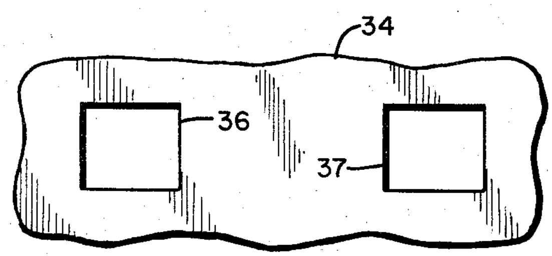

(D) Next, upon layer 30 and centered along axis 23 and about axis 22 are vapor deposited two copper interconnecting strips 32, 33 of approximately 40,000 A. in thickness. With particular reference to FIGURE 3 there is illustrated a portion of a mask 34 having apertures 36, 37 therethrough, each defining the contour of strips 32, 33, respectively, when utilized in a continuous deposition process as discussed above.

Figure 4:
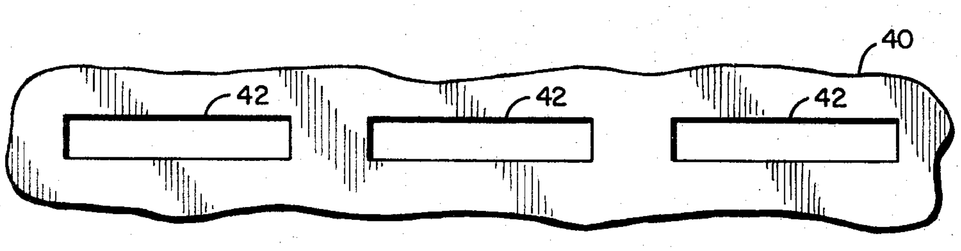

(E) Next, upon layer 30 and centered along axis 23 and about axis 22 and extending over the ends of strips 32, 33 so as to form a continuous electrical circuit therewith is vapor deposited copper bit line 38 of approximately 40,000 A. in thickness. With particular reference to FIGURE 4 there is illustrated a portion of a mask 40 having aperture 42 therethrough defining the contour of strip 38 when utilized in a continuous deposition process as discussed above.

(F) Next, a SiO layer 44 of 5,000 A. in thickness is vapor deposited on layer 30 and conductive strips 32, 33 and 34.

Figure 5:
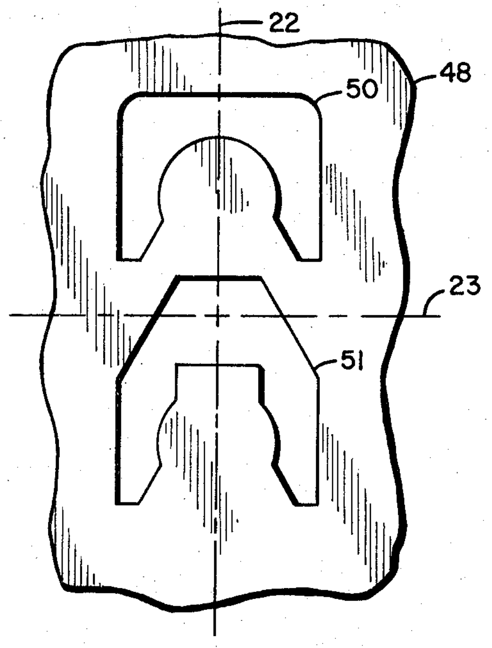

(G) Next, upon layer 44 and about apertures 18, 19 are vapor deposited two C-shaped thin ferromagnetic film layers 46, 47 of 4,000 A. thickness and approximately 80%Ni-20% Fe and having an anisotropic axis aligned with axis 22 providing an easy axis thereby. With particular reference to FIGURE 5 there is illustrated a portion of mask 48 having apertures 50, 51 therethrough, each defining the contour of layers 46, 47 respectively, when utilized in a continuous deposition process as discussed above.

(H) Lastly, a SiO layer 52 of 2,500 A. in thickness is vapor deposited over the entire stacked assembly for the sealing thereof.

It has been found by the applicant that the insulating layers of SiO, in the area of area 60 (see FIGURE 6), provide poor electrical insulating characteristics when element 10 is fabricated in a continuous deposition process. Due to the changing environmental conditions (temperature, pressure etc.) within the evacuatable enclosure during the deposition process and to the irregular surfaces of the metallic layers, the layers of SiO may develop pin-hole and crack-like apertures therethrough through which the currents flowing through the bit line may short through to the metallic layers. Consequently, to ensure desirable operation thereof each element 10 is electrically insulated, by no two elements 10 having common magnetizable material, from each other whereby there is prevented the possibility of the shorting of parallel, three adjoining lines 32, 33 and line 38. Further, as word lines 20, 21 may be uninsulated copper wires—in one embodiment word line 20 was an uninsulated copper wire of 0.017 inch diameter and word line 21 was an uninsulated tinned-copper selection-diode lead of 0.017 inch diameter—it is desirable that no magnetizable material be permitted to form on or to be deposited along the walls of the apertures 18, 19 in substrate 16 so as to permit the shorting of a word line 20, 21 through the magnetizable layers 24, 25, 46 and 47.

As stated above the layers of SiO provide poor electrical insulating characteristics. However, the layers of SiO are essential in the continuous deposition process to prevent the diffusion of the layers of magnetizable material and copper, particularly in the area of area 60. With the magnetic characteristics of memory area 60 being critical for the proper operation of element 10 it is essential that the diffusion between such metals be prevented. Accordingly, although such layers of SiO are not relied upon to provide electrical insulating characteristics such layers are utilized to preclude contamination of the magnetizable layers during the continuous deposition process.

Figure 6:
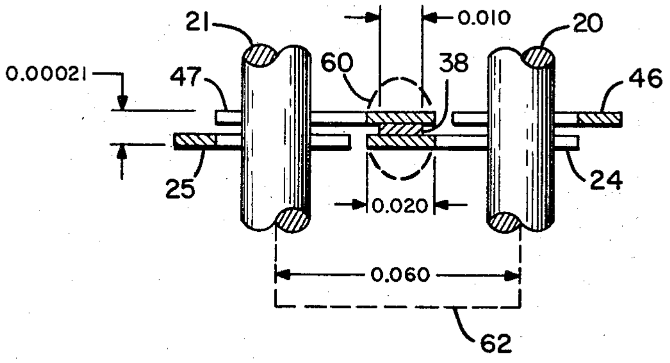
Figure 7:
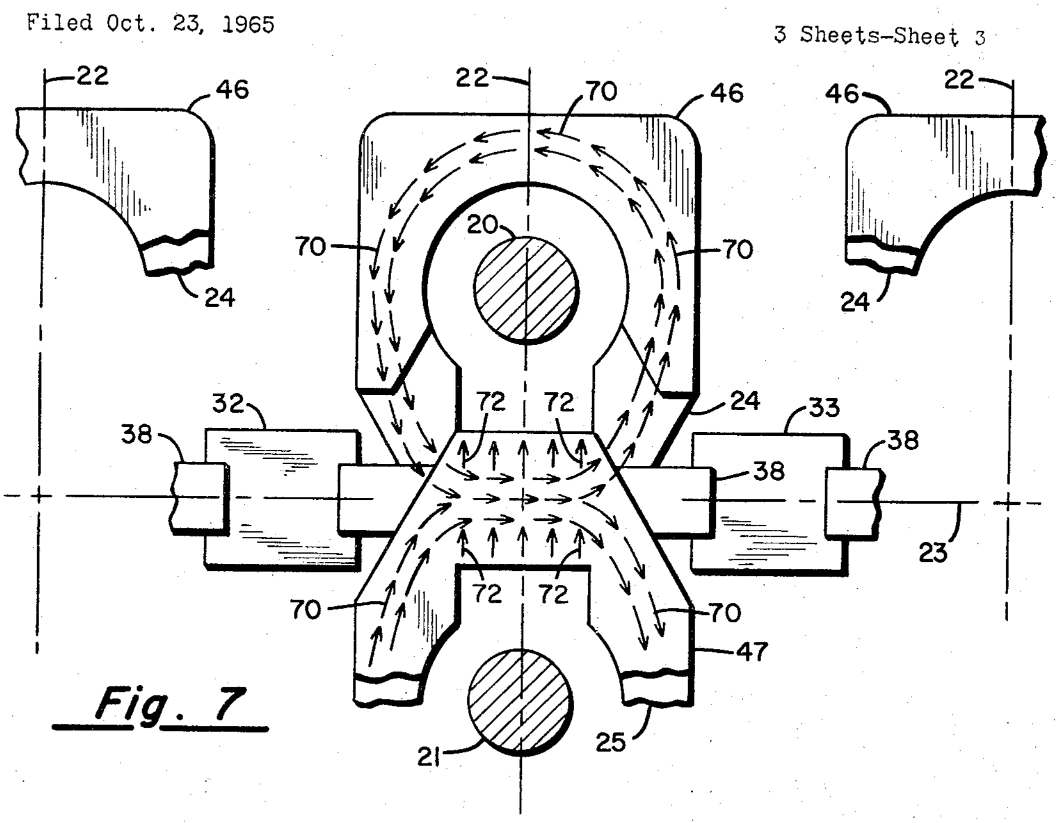

It is desirable that no magnetizable material be permitted to form upon the walls of apertures 18, 19 of substrate 16 for reasons other than to preclude the possibility of the shorting of a word line 20, 21 to a bit line 38. As disclosed in the aforementioned K. H. Mulholland application, area 60, see FIGURE 6 is the memory or active area of element 10 in which the binary information is written and from which the binary information is read. As the magnetizable material in the Mated-Film areas defined by numerals 12, 14 of FIGURE 1 play no or little part in providing an output signal to bit line 38 but do provide an area of high permeability, i.e., low reluctance, to the transverse drive field $H_t$ represented by arrows 70 of FIGURE 7 it is desirable that the amount of magnetizable material in the Mated-Film areas 12, 14 be kept to a minimum such that the transverse drive field $H_t$ be concentrated in the area of area 60 contiguous to bit line 38. Accordingly, it is desirable that no magnetizable material be formed along the walls of apertures 18, 19 in substrate 16 and that the amount of magnetizable material in the Mated-Film areas defined by numerals 12, 14 of FIGURE 1 be kept to a minimum consistant with the requirements of producibility and operability of element 10.

With particular reference to FIGURE 6 there is presented a diagrammatic illustration of a cross section of element 10 taken along axis 22 of FIGURE 1 with the passive members such as substrate 16 and layers 30, 44 and 52 omitted for the sake of clarity. FIGURE 6 points out the approximate dimensions of the memory area 60 of element 10 of the illustrated embodiment as indicating a width to thickness ratio of approximately 100. Further, with layers 24 and 47 having first portions forming the memory area 60 and having second portions extending about word lines 20, 21, respectively, there are illustrated the transverse drive field $H_t$ flux closing paths effected by the superposed mated-film portions of layers 46 and 25 that close the otherwise open flux paths of layers 24 and 47 about word lines 20, 21, respectively.

Inspection of the plan view of element 10 as illustrated in FIGURE 1 and the cross sectional view of element 10 as illustrated in FIGURE 6 indicates that element 10 has in its plan view the general form of a number 8 wherein two closed loops meet at a central intersectional area; superposed layers 46 and 24 form a first closed loop; superposed layers 47 and 25 form a second closed loop; and, superposed areas of layers 47 and 24 form the central intersectional area 60. This arrangement is, as discussed hereinabove, to provide two closed flux paths in the plane of element 10 that have a common portion in area 60.

It is apparent that the most expeditious method of forming element 10 would be to lay down two superposed, continuous, thin-ferromagnetic-film layers having the planar contour of element 10 and separated in area 60 by appropriate insulating layers of SiO and a bit line 38. However, as element 10 is to be formed in a continuous deposition process, such as discussed in the S. M. Rubens Patent Nos. 2,900,282 and 3,155,561, the planar contours of such vapor deposited layers are determined by the contours of the shape-defining masks associated with the particular layer. Inspection of masks 26 and 48 of FIGURES 2 and 5, respectively, and their shape defining apertures 28, 29 and 50, 51, respectively, indicate the nature of such masks. It is apparent that if one wished to lay down a continuous layer having the planar contour of element 10 one would require a mask having an aperture having an outside periphery that would match the external outline of the element 10 and having an inside periphery that would match the internal outlines of the openings through which word lines 20, 21 pass. It is apparent upon a consideration of the dimensions of element 10 that this is impossible; what structural means could support and align the mask portion defining such openings? Such structural means would be required to rigidly support and align the mask portions defining such openings while yet not affecting the manner of deposition of the layer in the area of such structural means.

An additional example on the limitations placed on the method of fabricating element 10 is indicated on the use of two masks 34 and 40 for the formation of the conductive strips 32, 33 and 38, respectively; the apparent solution would be to lay down one continuous conductive strip rather than the plurality of overlapping strips 32, 33 and 38. However, as with the use of masks 26 and 48, such use of overlapping strips is necessitated by the fact that a two-dimensional memory plane utilizing a plurality of elements 10 dictates that such elements 10 be aligned along axis 23 (see FIGURE 7)—in one application of the illustrated embodiment each memory plane was comprised of a 64 by 18 matrix array for a total of 1,162 elements 10, 64 elements 10 aligned along the axis 23—for the most efficient arrangement thereof. If a mask would permit the deposition of a continuous conductive strip permitting all 64 elements 10 aligned along axis 23 while yet adhering to the typical dimensions of FIGURE 1 were utilized such masks would be too flimsy, having no structural support between the joining apertures defining strips, to provide the required dimension stability. Accordingly, it is to be appreciated by one of ordinary skill in the art that the illustrated embodiment is only one of various arrangements, no limitation to the illustrated embodiment to be intended. The memory plane assembly formed by the sandwiched construction of substrate 16 through layer 52 (not including word lines 20, 21) is an integral package and preferably is formed by a continuous deposition process as disclosed in the aforementioned S. M. Rubens patents. In this arrangement of the preferred embodiment the magnetizable layers 24, 25, 46 and 47 are formed with an anisotropic axis parallel to axis 22 whereby a current signal coupled to conductive strip 38 establishes a longitudinal drive field $H_l$ particularly in layers 24 and 47 in memory area 60 in a circumferential direction around bit line 38 of a first or second and opposite direction representative of a stored "1" of a "0" as a function of the polarity of the current signal applied thereto. With the proper current signal coupled to intercoupled word lines 20, 21 (by a conductive strip 62, see FIGURE 6) there is established in the area 60 a transverse drive field $H_t$ that tends to align the magnetization M of layers 24 and 47, in the area of 60, into substantial alignment along the hard axis of area 60, i.e., that lies along a line parallel to axis 23.

With particular reference to FIGURT 7 there is illustrated a plan view of element 10 that illustrates the general configuration of the path of the magnetic flux generated by current signals flowing through word lines 20, 21 and bit line 38. With a suitable current signal coupled to word lines 20, 21 there is established about such word lines a magnetic field represented by arrows 70 flowing in a circumferential direction thereabout. This circumferential field about lines 20, 21 seeks a path of low reluctance and accordingly concentrates in the paths presented by layers 24, 25, 46 and 47. Further, with a suitable current signal coupled to bit line 38 there is established in the area of area 60 a magnetic field represented by arrows 72 flowing in a circumferential direction about bit line 38 of a first or second and opposite direction representative of a stored "1" or "0" as a function of the polarity of the current signal applied thereto. This magnetic flux in the area 60 is a longitudinal drive field $H_l$ oriented parallel to the easy axis of area 60 that is aligned with axis 22 and tends to cause the magnetization M of area 60 to become aligned with axis 22. With the magnetic fields schematically illustrated by arrows 70 and 72 established by suitable current signals flowing through word lines 20, 21 and bit line 38 being, in the area of area 60, in substantial alignment with axis 23 and axis 22, respectively, there are provided two magnetic fields orthogonal to each other in the area of area 60 that are vectorially additive such that by the proper selection of the relative field intensities the magnetization M of area 60 may be established into any one of a plurality of previously determined magnetic states in the rotational mode as disclosed in the S. M. Rubens et al. Patent No. 3,030,612.

Figure 8:
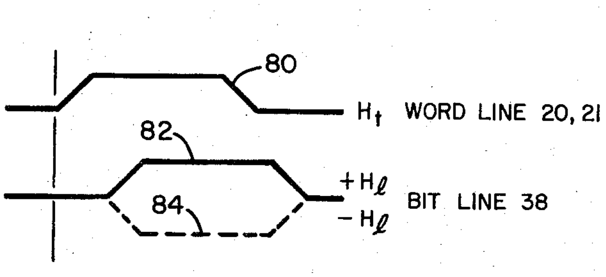

With particular respect to FIGURE 8 there are illustrated the waveforms of the current signals utilized to accomplish the writing operation of element 10. In this arrangement transverse drive field 80 is initially applied to element 10 by a current signal flowing through word lines 20, 21 rotating the magnetization M of area 60 out of alignment with its anistropic axis 22. Next, longitudinal drive field 82 for the writing of a "1" or longitudinal drive field 84 for the writing of a "0" is applied in the area of area 60 by suitable polarity current signals coupled to bit line 38 which longitudinal drive field $H_l$ steers the magnetization of area 60 into the particular magnetic polarization along anisotropic axis 22 that is associated with the respective polarities of waveforms 82 and 84.

Figure 9:
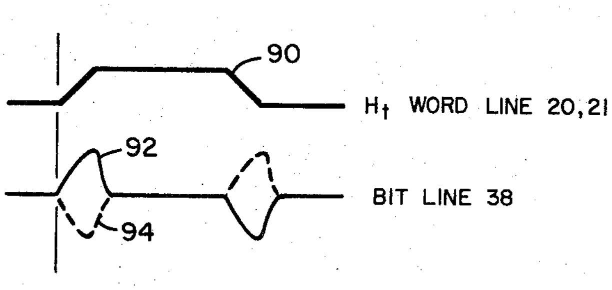

With particular respect to FIGURE 9 there are illustrated the signal waveforms associated with the reading operation of element 10. The readout operation is accomplished by the coupling of an appropriate current signal to word lines 20, 21 thus generating in the area of area 60 a transverse drive field 90 that is below the reversible limit of the memory area 60 and rotates the magnetization of area 60 out of alignment with its anisotropic axis 22 inducing in common bit-sense line 38 output signal 92 or 94 indicative of a stored "1" or "0," respectively, in area 60. As illustrated here, the polarity phase of the output signal during the readout operation is indicative of the informational state of the memory element 10 concerned.

Thus, it is apparent that there has been described and illustrated herein a preferred embodiment of the present invention that provides a novel memory and method of packaging thereof that provides an improved volumetric efficiency requiring decreased drive current intensities over prior art arrangements. It is understood that suitable modifications may be in the structure as disclosed provided that such modifications come within the spirit and scope of the appended claims. Having, now, fully illustrated the described art invention, what I claim to be new and desire to protect by Letters Patent is set forth in the appended claims.

1. A magnetizable memory element, comprising:
a substrate member;
said substrate member having first and second apertures therethrough and forming a web therebetween;
first and second open-flux-path layers of a magnetizable material;
said first and second layers each associated with said first and second apertures, respectively;
a conductive strip having a longitudinal axis oriented along said web;
third and fourth open-flux-path layers of magnetizable material;
said third and fourth film layers each associated with said first and second apertures, respectively, and each having portions superposed portions of said first and second layers, respectively, for closing the otherwise open flux path of said first and second layers around said first and second apertures, respectively, wherein said first and fourth layers have superposed central portions in the area of said web for sandwiching and enveloping said conductive strip therebetween with said central portions having sides overlapping said enveloped conductive strip for forming closely-coupled mated-film portions for creating a substantially-closed flux path about said enveloped conductive strip and orthogonal the longitudinal axis thereof;
said superposed central portions and said enveloped conductive strip forming a memory area;
binary information stored in said memory area in a first or second and opposite circumferential flux direction about said enveloped conductive strip.

2. A magnetizable memory element, comprising:
a substrate member;
said substrate member having first and second apertures therethrough and forming a web therebetween;
first and second open-flux-path thin-ferromagnetic-film layers of similar magnetizable material possessing the property of uniaxial anisotropy for providing in the plane of said layers an easy axis along which the film layer's remanent magnetization shall reside in a first or second and opposite direction along said easy axis;
said first and second film layers each associated with said first and second apertures, respectively;
a first insulating layer affixed to and superposed said first film layer at least in the area of said web;
a conductive strip affixed to said first insulating layer in the area of said web and having a longitudinal axis oriented along said web;
a second insulating layer superposed said conductive strip in the area of said web;
third and fourth open-flux-path thin-ferromagnetic-film layers of magnetizable material having the same magnetic characteristics as said first and second film layers;
said third and fourth film layers each associated with said first and second apertures, respectively, and each having portions superposed portions of said first and second layers, respectively for closing the otherwise open flux paths of said first and second layers around said first and second apertures, respectively, wherein said first and fourth layers have superposed central portions in the area of said web for sandwiching and enveloping said conductive strip therebetween with said central portions having sides overlapping said enveloped conductive strip for forming closely-coupled mated-film portions for creating a substantially-closed flux path about said enveloped conductive strip and orthogonal the longitudinal axis thereof;

said superposed central portions and said enveloped conductive strip forming a memory area;
binary information stored in said memory area in a first or second and opposite circumferential flux direction about said enveloped conductive strip.

3. A magnetizable memory element, comprising:
an electrically-insulating planar substrate member having orthogonally oriented major and minor axes in the plane thereof;
said substrate member having first and second apertures therethrough for forming a web therebetween and oriented symmetrically along said major axis and about said minor axis;
first and second C-shaped open-flux thin-ferromagnetic-film layers of similar magnetizable material having single domain properties and possessing the property of uniaxial anisotropy for providing in the plane of said layers an easy axis along which the film layer's remanent magnetization shall reside in a first or second and opposite direction along said major axis;
said first and second film layers oriented about said first and second apertures, respectively, with their open ends aligned along said major axis;
a first insulating layer superposed said first and second film layers;
a conductive strip having its longitudinal axis oriented along said minor axis and about said major axis and having a portion in the area of said web;
a second insulating layer superposed said conductive strip at least in the area of said web;
third and fourth C-shaped open-flux-path thin-ferromagnetic-film layers of magnetizable material having the same magnetic characteristics as said first and second film layers wherein said third and fourth film layer's remanent magnetization reside in a first and second and opposite direction along said major axis;
said third and fourth film layers oriented about said first and second apertures, respectively, with their open ends aligned along said major axis and having portions superposed portions of said first and second layers, respectively, for closing the otherwise open flux paths of said first and second layers around said first and second apertures, respectively, wherein said first and fourth layers have superposed central portions symmetrical about said minor axis for sandwiching and enveloping said conductive strip therebetween with said central portions having sides overlapping said enveloped conductive strip for forming closely-coupled mated-film portions for creating a substantially-closed flux path about said enveloped conductive strip and along said major axis;
said superposed central portions and said enveloped conductive strip forming a memory area; and
binary information stored in said memory area in a first or second and opposite circumferential flux direction about said enveloped conductive strip and along said major axis.

4. A magnetizable memory element, comprising:
an electrically-insulating planar substrate member;
said substrate member having first and second apertures therethrough and forming a web therebetween;
first and second open-flux-path thin-ferromagnetic-film layers of magnetizable material having single domain properties and possessing the property of uniaxial anisotropy for providing in the plane of said layers an easy axis along which the film layer's remanent magnetization shall reside in a first or second and opposite direction;
said first and second film layers each associated with said first and second apertures, respectively;
a first insulating layer superposed said first and second film layers at least in the area of said web;
a conductive strip having its longitudinal axis oriented along said web;

a second insulating layer superposed said conductive strip at least in the area of said web;

third and fourth open flux path thin-ferromagnetic-film layers of magnetizable material having the same magnetic characteristics as said first and second film layers;

said third and fourth film layers each associated with said first and second apertures, respectively, and each having portions superposed portions of said first and second layers, respectively, for closing the otherwise open flux path of said first and second layers around said first and second apertures, respectively, wherein said first and fourth layers have superposed central portions in the area of said web for sandwiching and enveloping said conductive strip therebetween with said central portions having sides overlapping said enveloped conductive strip for forming closely-coupled mated-film portions for creating a substantially-closed flux path about said enveloped conductive strip and orthogonal the longitudinal axis thereof;

said superposed central portions and said enveloped conductive strip forming a memory area;

binary information stored in said memory area in a first or second and opposite circumferential flux direction about said enveloped conductive strip;

an energized enveloped conductive strip generating said memory area first or second and opposite direction circumferential magnetic fields about said conductive strip;

first and second intercoupled word lines passing through said apertures and enveloping said memory area;

an energized first and second word line generating first and second planar magnetic fields, respectively, thereabout which planar fields are conducted along the substantially-closed planar flux paths presented by the superposed first and third film layers and the superposed second and fourth film layers, respectively, and into said memory area as vectorially additive fields orthogonal to said circumferential fields;

said planar magnetic fields and said circumferential magnetic fields vectorially additive in said memory area for setting the magnetization of said memory area in a first or second and opposite circumferential direction about said enveloped conductive strip as a first or second informational state, respectively;

said planar magnetic fields in said memory area affecting the remanent magnetization of said memory area for inducing in said enveloped conductive strip a signal whose polarity phase is indicative of the informational state of said memory area.

References Cited

UNITED STATES PATENTS

| | | | |
|---|---|---|---|
| 2,910,673 | 10/1959 | Bloch | 340—174 |
| 2,934,748 | 4/1960 | Steimen | 340—174 |
| 2,961,745 | 11/1960 | Smith | 29—155.5 |
| 2,985,948 | 5/1961 | Peters | 29—155.5 |

BERNARD KONICK, *Primary Examiner.*

S. URYNOWICZ, *Assistant Examiner.*

UNITED STATES PATENT OFFICE

CERTIFICATE OF CORRECTION

Patent No. 3,353,169 November 14, 1967

Richard P. Halverson

It is hereby certified that error appears in the above numbered patent requiring correction and that the said Letters Patent should read as corrected below.

Column 8, line 14, for "open-flux" read -- open-flux-path --.

Signed and sealed this 28th day of January 1969.

(SEAL)

Attest:

Edward M. Fletcher, Jr.
Attesting Officer

EDWARD J. BRENNER
Commissioner of Patents